Patented Mar. 23, 1943

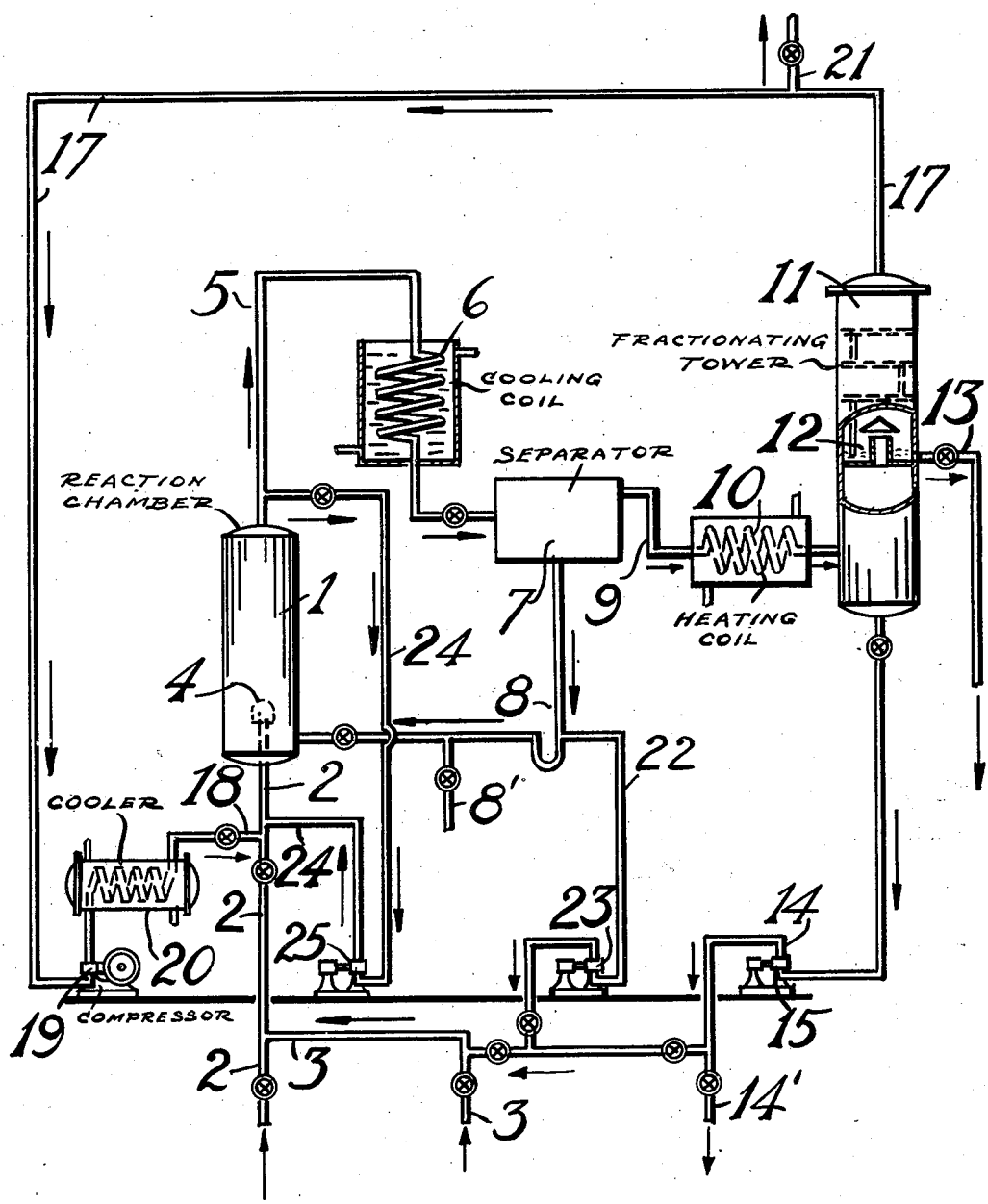

2,314,458

UNITED STATES PATENT OFFICE 2,314,458

POLYMERIZING OLEFINS

Eldon E. Stahly and Frank B. Johnson, Baton Rouge, La., assignors to Standard Oil Development Company, a corporation of Delaware Application September 30, 1938, Serial No. 232,496

8 Claims. (Cl. 196—10)

This invention relates to improvements in the process of polymerizing olefins, and pertains more particularly to the production of low boiling olefin polymers of motor fuel boiling range.

It has heretofore been proposed to form hydrocarbons within the motor fuel range by polymerization of normally gaseous olefins. The polymerization can be accomplished through the medium of various agencies well known in the art. For example, the polymerization can be accomplished by contacting the gaseous olefins with polymerizing catalysts such as, for example, sulfuric acid, phosphoric acid, aluminum chloride, complex metal halides such as sodium aluminum chloride, zinc chloride, boron fluoride, certain highly active clays, synthetic gels and the like. Polymers ranging from light liquid motor fuel constituents up to heavy solid or semi-solid products can be produced from such gaseous olefins.

By properly regulating the polymerizing conditions, such as temperature, pressure, type of catalyst, time of contact, olefin composition and other factors, the relative proportions of the different polymers present in the final product can be controlled within limits. For example, when polymerizing isobutylene under low temperature conditions, such as below —10° C., employing boron fluoride as a catalyst, the resulting product may consist chiefly of extremely high molecular weight solid or semi-solid polymers, whereas under higher temperatures employing sulfuric acid, phosphoric acid, activated clays, or the like, a product consisting principally of low molecular weight polymers of motor fuel boiling range, such as, for example, diisobutylene, may be obtained.

When operating the process to produce low molecular weight motor fuel polymers, however, there is normally formed, according to prior practices, a minor but nevertheless substantial portion of undesirable higher boiling polymers unsuitable for motor fuel, resulting in a reduction in yield of desired motor fuel constituents from any given supply of gaseous olefins.

The primary object of the present invention is to provide a process for the production of low molecular weight polymers of desired boiling range in which the formation of undesirable polymers boiling above the desired range is substantially avoided.

A further general object of the invention is to provide a process which will result in an increase in yield of polymers boiling within the desired range.

It is a further more detailed object of this invention to provide a continuous process for the production of polymers boiling within the gasoline range in which the formation of undesirable higher boiling polymers will be suppressed in favor of the formation of desirable lower boiling polymers within the motor fuel range The above objects and advantages are attained in accordance with the present invention by maintaining within the polymerizing zone only an amount of high boiling undesirable polymer products of the olefins being polymerized sufficient to prevent the formation of further undesirable higher boiling polymers. The amount of such undesirable polymers maintained within the polymerizing zone will vary with the nature and concentration of the olefins treated and the conditions maintained within the polymerizing zone such as, for example, temperature, pressure, nature of catalyst, time of contact and other factors, each of which should, of necessity, be inter-dependently correlated with the others so that as a practical matter it is not possible to state the specific amount of undesirable polymers which should be present in order to meet all conditions of operation.

The minimum amount of undesirable polymers necessary to suppress further formation may be readily determined by laboratory tests.

For example, the amount of undesirable polymers added to the polymerizing zone for any given set of conditions may be progressively increased until the amount of undesirable higher boiling products appearing in the reaction products is not substantially greater than the amount being charged into the polymerizing zone. Another convenient method is to carry out the polymerization in the conventional manner separating the resulting products into a desired lower boiling fraction and an undesired higher boiling fraction, and continuously recycling the undesired fraction to the polymerizing zone. When this is done, the undesired higher boiling polymers will accumulate or build up in the system until a point is reached where substantially no further undesirable polymers will be formed.

In its more specific aspect, the invention comprehends a continuous recycle operation of this nature.

The reaction conditions may be varied over quite a wide range depending upon the types of reactants, catalysts, etc., that are employed. Temperatures ranging from between about 150° F. and about 600° F. are satisfactory for most reaction conditions and for most catalysts. It is sometimes advantageous, especially when it is desired to carry out a continuous reaction, to maintain the feed stock substantially in the liquid phase and to use elevated pressures so correlated with the particular temperatures employed as to attain this desired liquid phase operation. Pressures of from about 100 lbs./sq. in. up to about 1900 lbs./sq. in. may be employed. Likewise, particularly in continuous operations, the feed rate to the reactor may vary considerably. Suitable rates, however, range from between about 30 and about 100 gallons of feed measured in the liquid phase per square foot of reactor cross-sectional area per hour.

Having thus described the general nature and the objects, the invention will be better understood from the more detailed description hereinafter in which reference will be made to the accompanying drawing which is a diagrammatic illustration of one form of an apparatus capable of carrying the invention into effect.

For illustrative purposes, there is shown in the accompanying drawing a diagrammatic illustration representing a process adapted to polymerize gases in liquid phase, employing sulfuric acid or other liquid as a catalyst. The process may be readily adapted to use a solid or gaseous catalyst as well. It will be understood, however, that the invention in its broader aspects is not restricted to the particular type of polymerizing process illustrated in the accompanying drawing and described more in detail hereinafter.

Referring to the drawing, the olefins to be polymerized, which may be a pure olefin or a mixture of olefins or a gas relatively rich in olefins, such as, for example, gases resulting from the cracking of petroleum oil, after being subjected to a pressure sufficient to convert said gas into a liquid, are introduced into the polymerizing reaction chamber 1 through charging line 2. There is also introduced into the reaction chamber 1 a predetermined minimum amount of polymers of such olefins boiling above those desired to be obtained as a final product. As shown, this product is introduced into the reaction chamber through line 3 which merges with charge line 2. It will be understood, however, that such higher boiling polymer may be separately introduced into the polymerizing chamber. These undesirable higher boiling olefins may be formed in the process or obtained from an extraneous source as hereinafter described. The amount added is sufficient to suppress further formation of such undesired polymers within the reaction chamber 1.

The reaction chamber 1 contains a body of sulfuric acid of a concentration ranging, for example, between 65 and 85 or more per cent, and is maintained at a temperature of the order of 125° F. to 300° F. In this connection it will be understood that the temperature and acid concentration are more or less reciprocal in that the lower the temperature employed, the higher should be the concentration of acid. When operating under these conditions, with a refinery butane cut containing about 10% isobutylene and about 20% normal butylene, the amount of undesired higher boiling polymers, combined with the fresh feed, will be of the order of 15% by weight.

The mixture of olefin-containing liquid and undesired higher boiling polymers, introduced into the polymerizing chamber 1, is dispersed into the acid by porous thimbles 4 or other suitable dispersing elements such as jets, turbomixers or the like, so that the mixture is dispersed in finely divided state into the body of the acid contained within the reactor.

Reaction products from chamber 1, containing some of the sulfuric acid entrained therein, pass overhead through line 5 to a cooling coil 6, and thence to a separator 7 in which the entrained acid separates from the reaction products. The sulfuric acid separated in chamber 7 is withdrawn therefrom and returned to the reaction chamber 1 through line 8. Fresh acid to make up for that lost in the process may be introduced into line 8 thru inlet 8'.

Reaction products, together with the undesired high boiling polymers introduced into the polymerizing chamber, after separation from the acid in the separator 7, pass through line 9 to a heating coil 10 in which the products are heated to a temperature sufficient to vaporize polymers boiling within the motor fuel boiling range. Products from the heating coil 10 discharge into a fractionating tower 11 containing fractionating elements, such as bubble trays, disc and doughnut baffles and the like, adapted to effect fractional condensation of the vapors introduced into the fractionating tower.

The fractionating tower may be provided with a trap-out tray 12 positioned in the upper portion of the tower to collect condensate formed above said tray. This condensate is withdrawn from the tower through line 13. The tower temperature is controlled so that the desired motor fuel constituents are collected above the trap-out 12 and withdrawn through line 13. The undesired higher boiling condensate collects in the bottom of the tower and is withdrawn through line 14.

In accordance with the preferred embodiment of the invention, the undesired higher boiling polymers withdrawn from the fractionating tower 11 through line 14, are received by means of pump 15 through lines 14 and 2 to the polymerizing chamber 1 as hereinbefore described. In cases where an extraneous source of undesired higher boiling polymers is not available, the process may be started without the introduction of the undesired higher boiling polymers into the reaction chamber. In such cases the undesired polymers will be initially formed in the process, and by recycling such polymers, they will continue to build up in the system until a condition is eventually reached when further formation of such undesired polymers is substantially suppressed.

Returning now to the fractionating tower 11, vapors remaining uncondensed therein are removed overhead through line 17. These, after being compressed by compressor 19 and liquefied in cooling coil 20, may be recycled to the inlet of the reaction chamber through line 18, or a part or all of the uncondensed vapors may be removed from the system through line 21. In cases where the fresh charging stock contains substantial quantities of saturated constituents, the vapors withdrawn from the fractionating tower 11 may be passed through suitable equipment, not shown, for removal of the saturated constituents before being returned to the polymerizing chamber if so desired.

Recycle line 14 is provided with a tap-off line 14' so that a portion or all of the undesired polymers collected in tower 11 may be withdrawn from the system. During operation, however, preferably all of such polymer is recycled to insure substantially no further formation of such polymers. Where a part or all of such polymers are withdrawn through line 14', equivalent amounts of undesired polymers are preferably charged to the polymerizing chamber through line 3.

In lieu of returning acid separated in separator 7 directly to the polymerizing chamber 1 through line 8 as before described, a part or all of the acid may be first combined with the undesired polymer or with the olefin fraction to be polymerized or both before being introduced into the reaction chamber so that the acid as well as the olefins and undesired polymers are caused to be dispersed into the chamber through thimble 4 or the like. To this end, the acid hydrocarbon mixture withdrawn from separator 7 through line 8 may be recycled through line 22 and pump 23 to recycle line 14 when it merges with the recycle higher boiling polymer. Also, if desired, a part of the acid hydrocarbon mixture withdrawn from the reactor through line 5 may be recycled through line 24 and pump 25 to give more intimate contact and better mixing of fresh feed and reaction mixture.

In cases where a solid catalyst is used, the polymerization reactor 1 may be packed with such solid catalyst, or the catalyst may be supported on a series of trays mounted within the chamber. In place of a single reaction chamber, two or more chambers arranged in parallel may be used whereby the catalyst contained in one or more of the chambers may be carrying out the process whereas the catalyst in other of the chambers is undergoing regeneration, thus providing for a continuous process in cases where solid catalysts are used as well as where liquid catalysts are used.

The term "polymerization" as here employed is intended to mean any one of the following reactions or any combination thereof. First, the union of two or more molecules of a simple monomer such as, for example, the union of two molecules of isobutylene to form diisobutylene. Second, the union of two or more molecules of unlike monomers of the same molecular weight but of different structural formula such as, for example, the union of a normal butylene with isobutylene. This reaction is often referred to as copolymerization. Third, the union of two or more molecules of unlike monomers of different molecular weights such as, for example, the union of propylene with butylenes. This reaction is often referred to as cross or hetero-polymerization.

The invention has been found to be especially applicable to the copolymerization reaction and particularly to the copolymerization of normal and isobutylene.

The term "undesired higher boiling polymers" as herein employed is intended to mean polymers boiling above the final desired product. The invention has been described with reference to the production of gasoline polymers. It will be understood, however, that in its broader aspects the invention comprehends the production of other intermediate final products such as Diesel and lubricating oils. It will be understood that in producing the latter named products, the undesired higher boiling polymers recycled to the polymerizing chamber will comprise those polymers boiling above the Diesel or lubricating oil as the case may be.

As a guide in carrying out the invention, the following examples may be helpful, it being understood that such examples are illustrative rather than limitative.

Example 1

A refinery $C_4$ fraction containing about 13.1% of isobutylene, about 22.0% of normal butylenes and the remainder consisting principally of butanes together with small amounts of propane and pentanes was first admixed with 15% by volume of undesired higher boiling polymers consisting principally of butylene co-trimers together with a small amount of heavier polymers. This mixture was charged into a reactor 5½ inches in diameter and 11 feet in length containing sulfuric acid of 70% concentration through a jet having an internal diameter of 0.10 inch at a rate of 23.8 liters per hour. The reactor was maintained at a temperature of 170° F. and under a pressure of 200 pounds per square inch. Products were continuously withdrawn from the reactor and allowed to separate into an acid phase and an oil phase. The acid phase was continuously returned to the reactor. The oil phase was then heated and fractionated to first liberate the spent $C_4$ fraction from the polymers. The polymers were then segregated into butylene dimers and polymers heavier than dimers.

The amount of trimers and heavier so recovered amounted to about 15% of the refinery $C_4$ fraction by volume which corresponded to the amount of such polymers combined with the $C_4$ fraction before being introduced into the reactor, thus showing that no additional trimer or heavier polymers were formed during the process. The yield of polymers formed in the process amounted to 66.3% by weight of the total $C_4$ unsaturates contained in the feed stock. The dimer product so produced consisted chiefly of the co-dimer of butylene and isobutylene, together with a small amount of diisobutylene.

Example 2

The process was repeated under substantially the same conditions outlined in Example 1, except that the amount of butylene trimer and heavier initially combined with the $C_4$ fraction amounted to 10% by volume rather than 15% as in Example 1. In this case, the final product, excluding the trimers and heavier initially added to the reactor, consisted of 96% butylene dimers comprising chiefly co-dimers, and 4% butylene trimers and heavier hydrocarbons. The total yield of polymers formed amounted to 68.8% by weight of the $C_4$ unsaturates contained in the feed stock.

Example 3

The process set forth in Example 1 was repeated under substantially the same conditions, except that no undesirable higher boiling butylene trimers were combined with the feed stock to the reactor. In this case, 15% of butylene trimers and heavier was recovered from the process, thus showing that in the absence of the butylene trimers 15% of undesirable butylene trimers was formed within the process. The yield of polymers formed in this case amounted to 70% by weight of the unsaturates contained in the feed stock, of which, as already mentioned, 15% consisted of undesirable butylene trimers and heavier.

From the above examples, it will be seen that when operating under conditions set forth therein, it is necessary to combine a minimum of about 15% by volume of butylene trimers into the feed stock to suppress further formation of such trimers during the process. While 15% by volume is the minimum percentage when operating under the conditions set forth in the examples, it will be understood that it is not minimum under all conditions of operation. The minimum percentage of undesired higher boiling polymers to be combined with the feed stock prior to introduction into the reaction zone can, however, readily be determined by simple experiments. When producing co-dimers of butylene the amount of trimers or heavier to be combined with the feed stock may be roughly estimated by assuming from 180 to 200% yield of co-dimers based on the amount of isobutylene contained in the feed and supplying an approximately equal weight of such butylene trimer or heavier to the charge.

While it will be clear from the above examples that when operating under the conditions set forth therein it is necessary to combine at least about 15% of butylene trimers or heavier to suppress further formation of such trimers in the reaction, it should be mentioned that the presence of higher percentages of such trimers will not adversely affect the reaction but, in fact, increase the total yield of dimers resulting from the process.

From the following examples, it will be apparent that the invention is not restricted to a process employing hot sulfuric acid as a catalyst.

Example 4

A C₄ fraction of the composition set forth in Example 1 was first combined with about 8% by volume of butylene trimers and heavier, and this mixture was charged into a reactor 2.5 inches in diameter and 5 feet in length packed with a solid catalyst consisting of phosphoric acid supported on Kieselguhr. The reactor was operated at a temperature of 290° F. and under a pressure of 550 pounds per square inch. The final product consisted of 95% dimers comprising chiefly co-dimers and 5% butylene trimers and heavier consisting principally of co-trimers, excluding the original 8% co-trimers added to the first charge.

Example 5

The process set forth in Example 4 was repeated under substantially the same conditions except that no butylene trimers were combined with the fresh feed during the operation. In this case, the polymer products comprised 88% dimers consisting principally of co-dimers of normal and isobutylene and 12% of trimers and heavier. The yield of polymers in this case amounted to 60% of the unsaturates contained in the feed stock.

Example 6

A C₄ fraction of the composition set forth in Example 1 was first combined with 8% by volume of butylene trimers and the resulting mixture was charged into the reactor similar to that employed in Examples 4 and 5, but containing activated clay in pill form of the type known in the trade as Super Filtrol. The reactor was maintained under a temperature of 300° F. and under a pressure of 550 pounds per square inch. In this case, the resulting polymers amounted to 41.6% of the total C₄ unsaturates contained in the feed. The polymer product consisted of about 57% dimers and 43% trimers and heavier after deduction of the original 8% combined with the feed.

Example 7

The process set forth in Example 6 was repeated, except that no trimers were combined with the feed stock prior to introduction into the reactor. In this case, the amount of polymers formed amounted to 46% of the unsaturates contained in the feed stock and 50% of the polymer product consisted of dimers and 50% trimers and heavier.

It will be apparent from the above examples that the presence of the trimer in the reactor tends to suppress the formation of further trimers and that by combining a sufficient quantity of trimer, further formation of such trimer may be virtually suppressed.

In the appended claims, the words "trimer and heavier polymers" are intended to include trimer products whether they be co-trimers, trimers, or cross-trimers.

Having described the preferred embodiment of the invention, and given specific examples, it will be understood that the invention embraces such other variations and modifications as come within the spirit and scope thereof. It will be further understood that it is not our intention to unnecessarily restrict the invention or to deduct any novel features thereof.

We claim:

1. In the process of catalytically polymerizing normally gaseous monoolefins to liquid hydrocarbons of predetermined boiling range and wherein the final product is fractionated into a lighter fraction, a middle fraction and a heavier fraction, substantial quantities of the higher boiling products being normally formed in the process, the improvement which comprises recycling substantially all of such higher boiling polymers contained in the reaction product to the polymerization zone in amounts substantially equal to the amounts normally formed in the reaction and at the same rate at which they are formed in and removed from the said reaction.

2. In a process for the conversion of low boiling olefins into higher boiling hydrocarbons of predetermined boiling range wherein said olefins are passed through a reaction zone containing a catalyst maintained under conditions capable of effecting said conversion, and the products from said reaction zone fractionated to separate a product of said predetermined boiling range and wherein reaction products boiling above the desired range are normally formed in the process, the improvement which comprises continuously introducing into said reaction zone only a quantity of said last named higher boiling reaction products sufficient to substantially completely suppress the formation of said products during the process.

3. A process which comprises polymerizing a cracked refinery gas containing a substantial quantity of butylenes at an elevated temperature and under a sufficient superatmospheric pressure to maintain the reactants liquid under the reaction conditions obtaining, in the presence of a liquid mineral acid polymerizing catalyst, fractionating the resulting polymer mixture to separate the same into a fraction boiling within the desired motor fuel boiling range and a heavier fraction, and returning substantially all of said heavier fraction to the polymerizing zone in an amount substantially equal to the amount normally formed in the relation and at the rate at which the heavier fraction is formed in said reaction.

4. A process which comprises dispersing a liquefied normally gaseous hydrocarbon mixture containing olefins into a liquid polymerizing catalyst within a reaction zone maintained under conditions which will polymerize said olefins into higher boiling polymers, continuously withdrawing from said reaction zone a mixture of reaction products and a liquid catalyst, removing the liquid catalyst from the reaction products and returning the same to the reaction zone, fractionating the reaction products to segregate a fraction of desired predetermined boiling range and introducing into said reaction zone only that quantity of polymers of said olefins boiling above the desired boiling range sufficient to substantially prevent formation of said last named polymers in the process.

5. In process as defined in claim 4, the further improvement which comprises combining a portion of the mixture of reaction products and liquid catalyst with said refinery gas prior to dispersing the same into said liquid polymerizing catalyst.

6. The process as defined in claim 4 in which the liquid catalyst is sulphuric acid.

7. In the process of polymerizing a refinery gas containing a substantial quantity of normal and isobutylenes at a temperature between about 150° F. and about 600° F. and at a pressure between about 100 and about 1900 lbs./sq. in. by passing the reactants over a polymerizing catalyst, followed by separation of the polymers boiling within the motor fuel boiling range from heavier polymers, the improvement which comprises returning to the original polymerizing reaction chamber substantially all of said heavier polymers in the amount and at the rate at which they are formed in the reaction.

8. The process which comprises continuously polymerizing a cracked refinery gas consisting principally of butanes and butylenes and containing about 13.1% of isobutylene and about 22.0% of normal butylenes at a feed rate of between about 30 and about 100 gallons per square foot reactor cross-sectional area per hour in a polymerizing zone maintained at about 170° F. and under about 200 lbs./sq. in. and containing sulphuric acid of about 70% concentration, continuously passing the reacted mixture into a fractionating tower, continuously separating the fraction boiling within the motor fuel boiling range and continuously returning all of the heavier polymer bottoms from the fractionation to the feed line to the polymerizing zone.

ELDON E. STAHLY.
FRANK B. JOHNSON.